(12) United States Patent
D

(10) Patent No.: US 12,067,265 B2
(45) Date of Patent: Aug. 20, 2024

(54) IDLE POWER MODE FOR EXTERNAL STORAGE DEVICE

(71) Applicant: Western Digital Technologies, Inc., San Jose, CA (US)

(72) Inventor: Pavan D, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/390,643

(22) Filed: Jul. 30, 2021

(65) Prior Publication Data
US 2023/0035137 A1   Feb. 2, 2023

(51) Int. Cl.
*G06F 3/06* (2006.01)

(52) U.S. Cl.
CPC .......... *G06F 3/0625* (2013.01); *G06F 3/0656* (2013.01); *G06F 3/0659* (2013.01); *G06F 3/0679* (2013.01)

(58) Field of Classification Search
CPC .... G06F 3/0625; G06F 3/0656; G06F 3/0659; G06F 3/0679
See application file for complete search history.

(56) References Cited

U.S. PATENT DOCUMENTS

| | | | |
|---|---|---|---|
| 8,417,979 B2 | 4/2013 | Maroney | |
| 8,843,700 B1 * | 9/2014 | Salessi | G06F 3/0625 711/103 |
| 9,785,356 B2 | 10/2017 | Huang | |
| 11,222,144 B2 * | 1/2022 | Ogawa | H04L 9/0897 |
| 2009/0019301 A1 * | 1/2009 | Minami | G06F 3/0625 713/324 |
| 2012/0226927 A1 * | 9/2012 | Kagan | G06F 1/3225 713/323 |
| 2014/0310532 A1 * | 10/2014 | Ali | H04L 9/0869 713/189 |

(Continued)

OTHER PUBLICATIONS

An article titled "Do HDDs or SSDs need 'exercise'? The Rocket Yard Investigates" by Tom Nelson, posted Feb. 14, 2018 attached to this office action and available online at https://eshop.macsales.com/blog/43702-we-bet-you-didnt-know-that-your-hdds-or-ssds-may-need-exercise-too/ (Year: 2018).*

(Continued)

*Primary Examiner* — Michael Krofcheck
*Assistant Examiner* — Janice M. Girouard
(74) *Attorney, Agent, or Firm* — Chang & Hale LLP

(57) ABSTRACT

Systems and methods are disclosed for reducing idle power usage of a storage device. The storage device can include a storage media configured, a data interface configured to connect to the host device, a media controller, and a bridge controller. The bridge controller can be further configured to, in response to receiving an idle status message from the media controller, save state data of the media controller, send a shutdown command to the media controller to stop it from using power. The bridge controller can be further configured to, in response to receiving a read operation or a write operation from the host device, start power to the media controller, provide the media controller with the saved state data, receive data responsive to the read operation or the write operation from the media controller, and transmit the responsive data to the host device.

20 Claims, 4 Drawing Sheets

(56) References Cited

U.S. PATENT DOCUMENTS

2017/0003901 A1*  1/2017  Alcantara ............. G06F 1/3209
2021/0064253 A1*  3/2021  Tonry ...................... G06F 21/78
2021/0191883 A1*  6/2021  Shin .................... G06F 12/1466

OTHER PUBLICATIONS

An article titled The Best M.2 Solid-State Drives for 2020 by John Burek, dated Feb. 3, 2020 attached to this office action and available online at https://web.archive.org/web/20200213030828/https://www.pcmag.com/picks/the-best-m2-solid-state-drives (Year: 2020).*

* cited by examiner

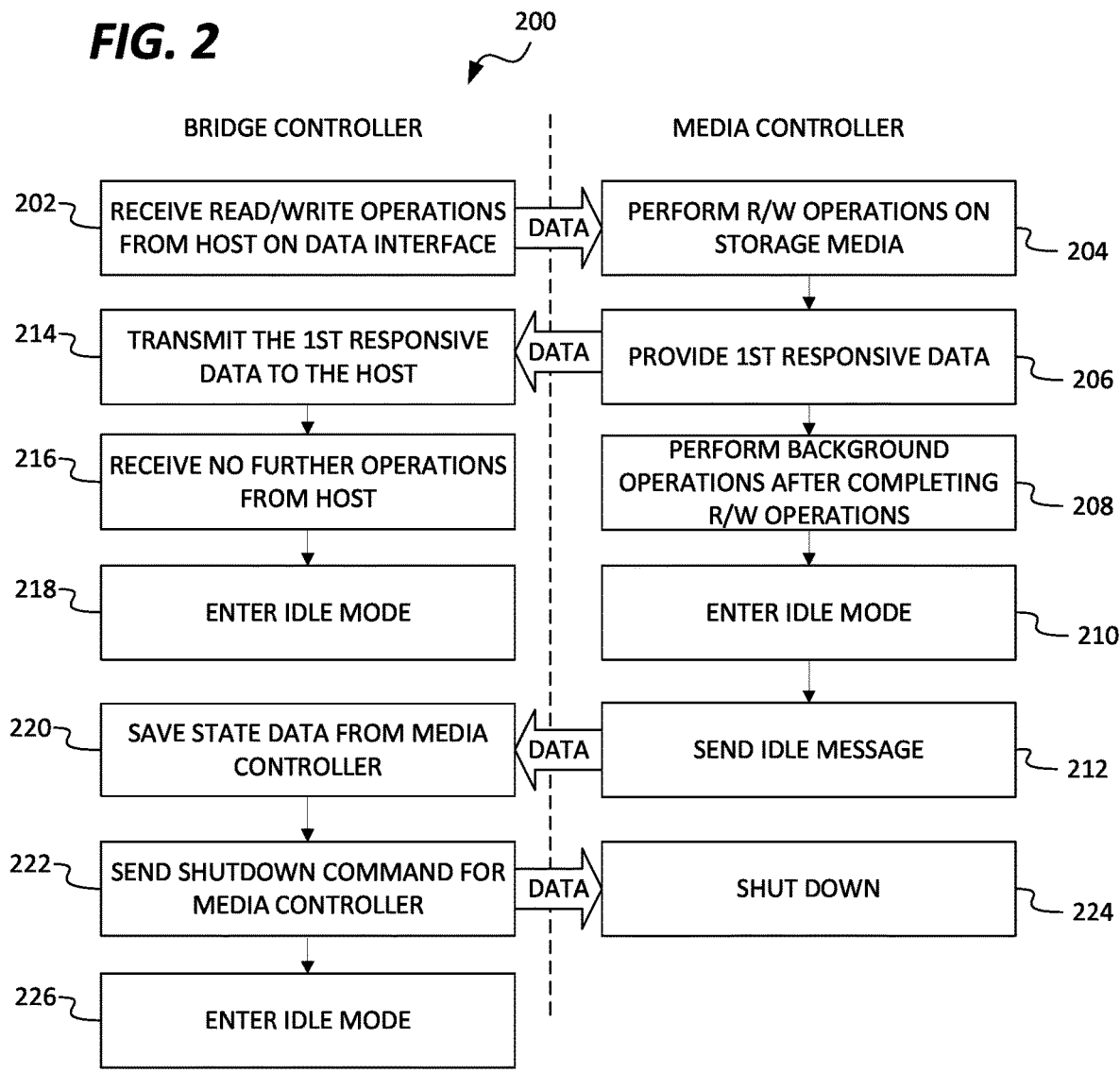

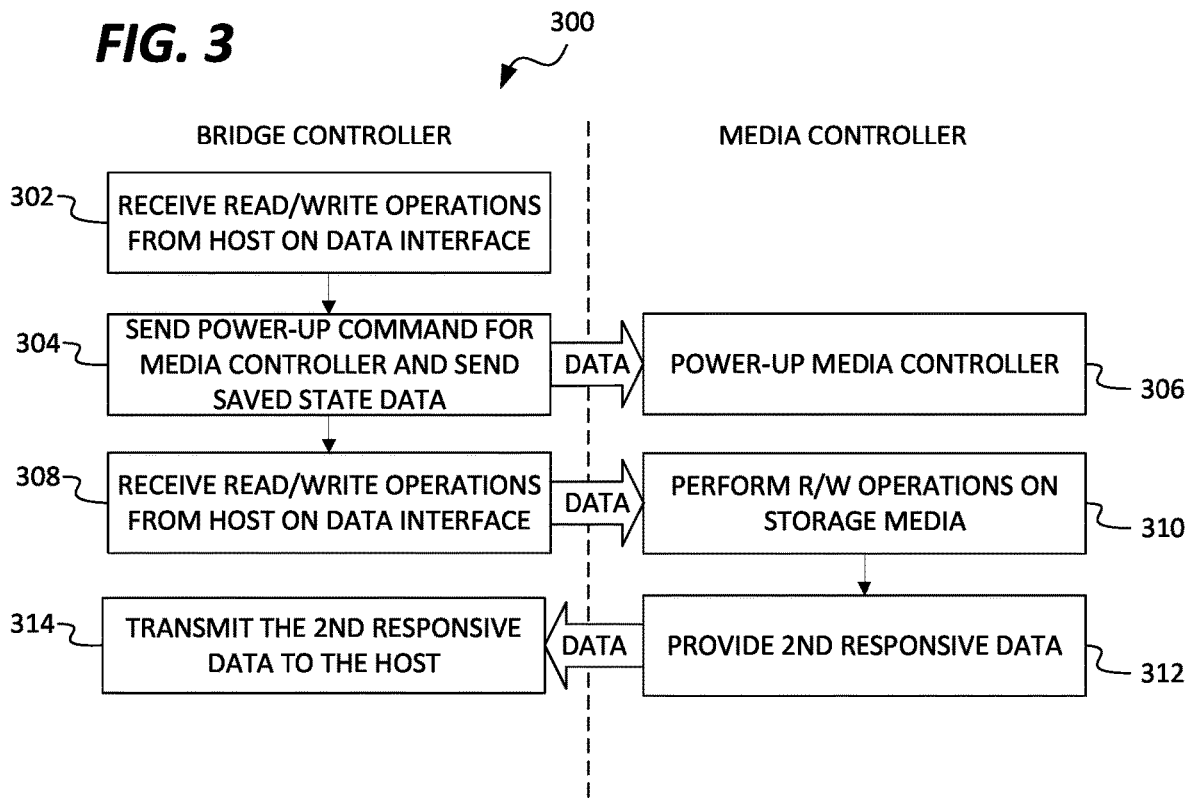

IDLE POWER MODE FOR EXTERNAL STORAGE DEVICE

BACKGROUND

Field

This disclosure relates to data storage devices. More particularly, the disclosure relates to systems and methods for reducing power consumption of data storage devices.

Description of Related Art

External storage devices enable host computing devices, such as personal computers, laptops, and tablets, to expand available memory. Generally, the external storage device is connected to a host computing device via a data connection, which enables transfer of data to and from the two devices.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 2 is a flow diagram of a shutdown process for entering a very low power mode, according to some embodiments.

FIG. 3 is a flow diagram of a startup process for exiting a very low power mode, according to some embodiments.

FIG. 4 is a table listing the power levels used by the external storage device, according to some embodiments.

DETAILED DESCRIPTION

Figure 1:
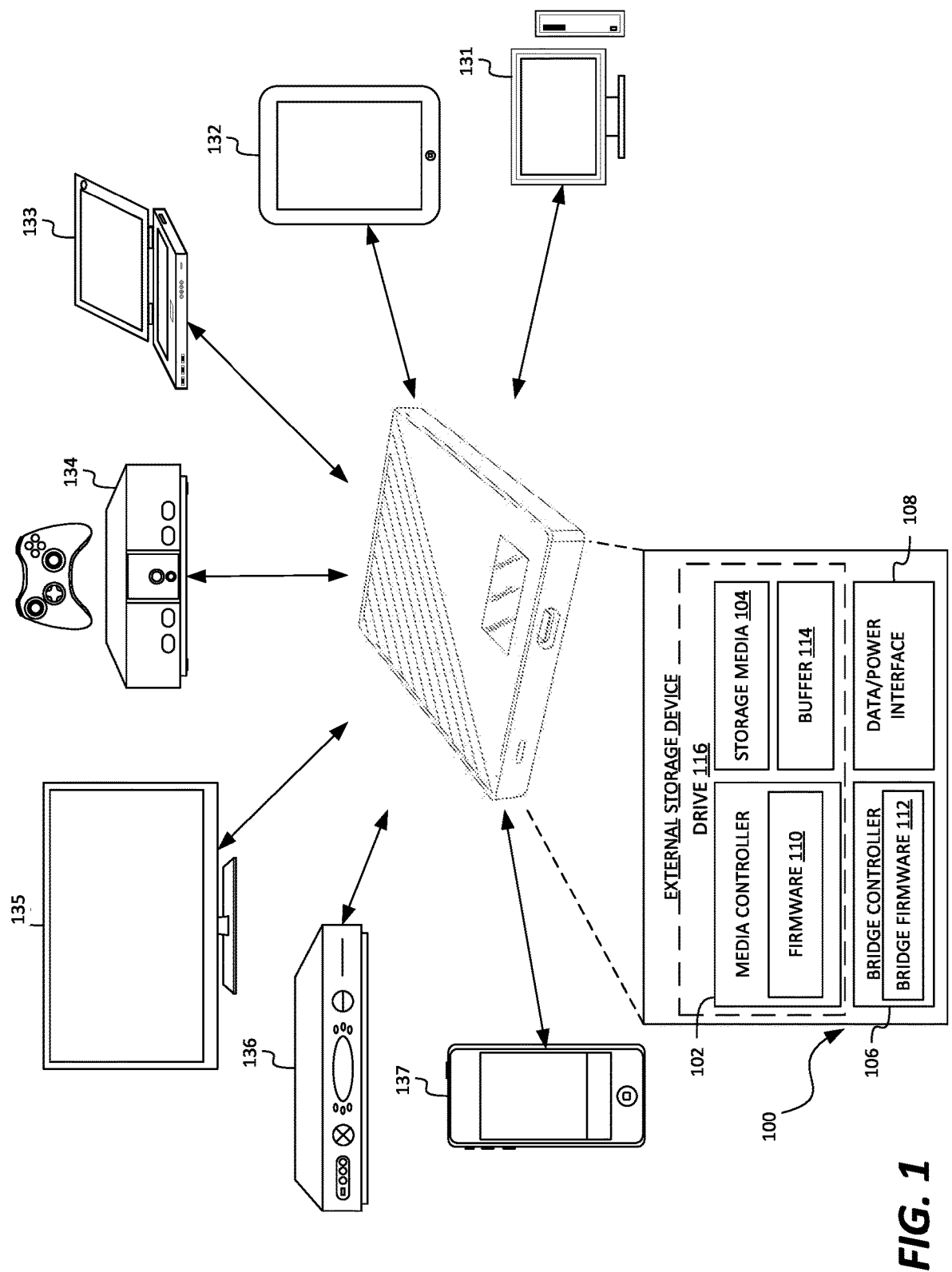
FIG. 1 is a diagram illustrating an external storage device, according to some embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Disclosed herein are systems, devices, and methods for enabling external storage devices to enter a very low power mode. When connected to a host device, the external storage device can enable the host device to read from or write to it, thereby providing the host device with additional storage space. Typically, the external storage device does not have its own power source, but relies on the connection to the host device, such as a universal serial bus (USB) connection, to provide power.

As the external storage device may be connected to the host device for a long time, it can be beneficial for the external storage device to enter a very low power mode when idle. In many situations, the host device is battery-operated (e.g., a laptop or tablet) and a very low power mode for the external storage device can help extend the battery life of the host device by reducing the power draw of the external storage device. Thus, a very low power mode that is lower than a typical idle mode provides some additional benefit in these situations. For example, a normal idle mode may utilize around 0.58 to 0.83 watts while a very low idle mode may use around 0.34 to 0.4 watts, for an additional savings of around 0.2 to 0.25 watts. Other embodiments may have more (e.g. 0.3-0.5 watts) or less (e.g. 0.1-0.2 watts) power savings for the very low power mode. In addition, while the following discusses external storage devices, the very low power mode may also be implemented in other storage devices (e.g., internal drives) where a secondary controller is present in the storage device and may be turned off by a primary controller.

In some embodiments, the external storage device includes both a media controller for controlling storage media operations and a bridge controller for translating protocols between the host device and the external storage device. The media controller can control read/write operations to storage media. Meanwhile, the bridge controller can control and manage the data and/or power interface between the external storage device and the host device.

If no data is being received on the data interface, the bridge controller can idle. When no data operations are being performed by the media controller, the media controller can idle. With both the bridge controller and the media controller in idle, the external storage device can enter a low power mode. However, by implementing additional functionality in the bridge controller, the bridge controller can shut down power to the media controller while no data operations are occurring. This can enable the external storage device to enter a very low power mode, as the media controller is not drawing power while the bridge controller is also in a low power idle mode. When data operations need to be performed on the storage media, the bridge controller can then restart the media controller as needed.

The systems and methods of this disclosure may be useful in various types of data storage devices such as hard disk drives (HDDs), solid state hybrid drives (SSHDs), and solid-state drives (SSDs) used in external storage devices (e.g., USB portable storage drive) or internal storage devices installed into a system (e.g., computer or server). SSDs may include non-volatile memory and volatile memory, such as random access memory (RAM). As used in this application, "non-volatile solid-state memory," "non-volatile memory," "non-volatile memory die", "NVM," "solid-state memory," "solid-state data storage," "semiconductor memory die" or variations thereof may refer to solid-state memory such as NAND flash. Solid-state memory may comprise a wide variety of technologies, such as flash integrated circuits, Phase Change Memory (PCM, PC-RAM, or PRAM), Programmable Metallization Cell RAM (PMC-RAM or PMCm), Ovonic Unified Memory (OUM), Resistance RAM (RRAM), NAND memory, NOR memory, electrically erasable programmable read-only memory (EEPROM), Ferroelectric Memory (FeRAM), Magnetoresistive RAM (MRAM), or other discrete NVM (non-volatile solid-state memory) chips. Other forms of storage (e.g., battery backed-up volatile dynamic RAM (DRAM) or static RAM (SRAM) devices, magnetic disk drives, etc.) may additionally or alternatively be used.

External Storage Device

FIG. 1 is a diagram illustrating an external storage device 100, according to some embodiments. An external storage device 100 can include a combination of hardware and software (e.g. firmware). In one embodiment, the external storage device 100 is a portable storage drive or other type of direct-attached storage. In one embodiment, the external storage device 100 is a data storage device without its own power source that obtains power from a directly-connected host device. Such a connection can include USB (e.g., USB 2.x, USB 3.x, USB Type-C, etc.), Lightning, Serial Advanced Technology Attachment (SATA), external SATA (eSATA), Thunderbolt, or other types of connections. The external storage device 100 may be physically connected via a cable to one or more host devices.

Types of host devices can include phones 137, such as smart phones, cable set-top boxes 136, smart TV's 135, video game consoles 134, laptop computers 133, tablet computers 132, desktop computers 131, wearable computers (not shown) and/or other computing devices that enable expansion of data storage by adding external storage devices 100. In one embodiment, the external storage device 100 is a USB memory card reader with a memory card (e.g., secure digital (SD), miniSD or microSD) that is connected to a host device.

In some embodiments, the external storage device 100 comprises a media controller 102, a storage media 104, a bridge controller 106, and a data/power interface 108. The media controller may be a SD host controller chip, a hard disk controller, an SSD controller, an integrated circuit, or the like. The media controller can be configured to run firmware 110 for controlling access, read, write, modify, and/or delete operations on the storage media 104. For example, the firmware 110 may track into which memory blocks or tracks data are written. Meanwhile, the bridge controller 106 can be configured to run bridge firmware 140 for running protocols for connecting, communicating, and/or providing power between computers, peripherals and/or other computers. The data/power interface 108 may comprise hardware for facilitating a connection to a host device, such as a data/power port like a USB port.

The term "controller" is used herein according to its broad and ordinary meaning, and may refer to any circuitry, hardware module, or component of the external storage device 100 configured to perform any of the functional aspects of the present disclosure. For example, one or any combination of circuitry from a storage controller, a media controller, and/or a data interface can be referred to as a controller or part of a controller.

In an embodiment, the external storage device 100 is a portable drive comprising an SSD or HDD drive 116 and a USB bridge (or other interface) contained in an enclosure, with a USB port exposed by the enclosure, the USB port connected to the USB bridge inside the enclosure. The SSD or HDD drive 116 may be designed to a standard form factor for internal drives for computing systems. For example, the SSD drive may use a 2.5 inch SSD or M.2 form factor, while the HDD may use a 3.5 inch or 5.25 inch form factor.

As internal drives typically do not use a USB interface but more commonly use SATA, serial attached SCSI (SAS), Peripheral Component Interconnect Express (PCIe), or non-volatile memory express (NVMe) interfaces, the media controller of a drive does not typically support USB. Using a USB bridge enables the external storage device 100 to add USB support to off-the-shelf drives without further modification to the drives. The inclusion of the USB bridge can enable the external storage device 100 to translate between the other interface protocols supported by the drive and the USB protocol. For example, the USB bridge may be a USB-SATA bridge, a USB-SAS bridge, a USB-NVMe bridge, or a USB-PCIe bridge.

In one embodiment, the media controller 102 is an embedded processor or microcontroller with, optionally, system RAM, a read-only memory (ROM) for storing firmware, error correction code (ECC) circuitry, flash component interface, magnetic recording media interface, and/or a host electrical interface (e.g., SATA, SAS, NVMe, etc.). In some embodiments, the media controller 102 is part of the SSD or HDD drive, while the bridge controller 106 is external to the SSD or HDD drive (e.g., part of the USB bridge discussed above).

In one embodiment, the bridge controller 106 is an embedded processor or microcontroller. In one embodiment the bridge controller supports the USB protocol and/or is a USB bridge controller. A bridge device with a bridge controller provides a way to integrate a USB interface with a non-USB interface. As described above, the media controller 102 may support other interfaces that do not include USB. The bridge controller 106 can add support for a USB interface to the external storage device 100 without needing to modify the media controller 102.

In some embodiments, the bridge controller 106 is associated with a physical data/power interface 108, such as a USB port and its many USB variations. Typically, the interface 108 provides both data and power, though some embodiments may provide the data and power using separate connectors. In one embodiment, the data/power interface 108 enables the external storage device 100 to be connected to a host device via a cable, such as a USB cable. The cable can connect to a corresponding port on the host device that supports the same data/power protocol as the data/power interface 108.

In at least some versions of USB communications, data is transmitted as packets. Initially, all packets are sent from the host via the root hub, and possibly more hubs, to devices. Some of those packets direct a device to send some packets in reply. Other than a sync field, all packets are made of 8-bit bytes, transmitted least-significant bit first. The first byte is a packet identifier (PID) byte, with a 4-bit PID followed by its bitwise complement. The redundancy of the PID bits helps detect errors. Later versions of the USB specifications may change some of the above details.

In forming a connection, USB devices go through an enumeration process. USB enumeration is the process of USB device recognition by the host, which includes detecting, identifying and loading drivers for the USB device on the host. This involves a mixture of hardware techniques for detecting something is present and software to identify what has been connected. It begins when the USB device is plugged into the host.

At a high level, the enumeration process starts with plugging in the device into the host. The host detects the device, identifies the speed of the device, gets device descriptors, resets the device and assigns an address, gets config descriptors, gets interface descriptors, and loads drivers. After the enumeration process, the device is then ready to use.

In some embodiments, the storage media 104 comprises non-volatile memory such as NAND flash or other types of solid-state memory. The non-volatile memory can be used for persistent storage of one or more media files. In some embodiments, the storage media 104 comprises a magnetic disk drive, alone (e.g., HDD) or in combination with solid-state memory (e.g., SSHD). The storage media 104 may use a buffer 114 for temporarily storing data. The buffer 114 can be RAM, cache, or other volatile memory. Typically, the buffer 114 is a separate component from the storage media 104, though some embodiments may use a portion of the storage media 104 as a buffer.

In some embodiments, the external storage device 100 is unpowered (e.g., an unpowered portable drive without a battery) and disconnecting from the host device can cause data stored on the buffer 114 to be lost or corrupted. In one scenario, the external storage device 100 may receive a disconnect notification from the host device (e.g., phone 137) and flush the buffer 114 to the storage media 104. In some situations, the external storage device 100 may lose power before the buffer 114 can be flushed to non-volatile memory in the storage media 104, resulting in data loss.

The above has discussed some possible implementations of the external storage device 100, but others are possible. For example, the external storage device may be battery operated and the very low power mode is implemented to extend the battery life of the external storage device. Such a battery-operated device may connect to the host device wirelessly, as it doesn't need to receive power from the host device.

Bridge Controller and Media Controller Operations

FIG. 2 is a flow diagram of a shutdown process 200 for entering a very low power mode, according to some embodiments. As discussed above, in one embodiment, the bridge controller 106 is configured to power down the media controller 102 when both are idle. For ease of explanation, the following describes the bridge controller 106 and media controller 102 as performing the process, though other components of the external storage device 100 may also be involved in performing one or more of the steps. In addition, the process is described using the components of the external storage device 100 of FIG. 1, however, other storage device embodiments can utilize the process 200.

At block 202, the bridge controller 106 receives read and/or write operations from a host device (e.g., laptop 133 or desktop computer 131) on a data interface (e.g., the data portion of the data/power interface 108). In one embodiment, the data interface is a USB interface comprising a USB port of the external storage device 100. The bridge controller 106 then sends data to the media controller 102, the data including the read and/or write operations from the host device. The bridge controller 106 may transform the data received from the host device, by, for example, converting the data from being encapsulated in USB protocol to another protocol (e.g., SATA, NVMe, etc.) that is supported by the media controller.

At block 204, the media controller 102 receives the data from the bridge controller 106 and performs the read and/or write operations on the storage media 104 of the external storage device 100. For example, the media controller 102 may read data, write data, or perform maintenance operations on the storage media 104.

At block 206, the media controller 102 provides first responsive data to the bridge controller 106. For example, if the media controller 102 received a read request, it can send back the requested data. In another example, if the media controller 102 received a write request, it can send back a status update the write is completed. In one example, if the media controller 102 received a request to perform a maintenance operation, it can send back a status update the operation is complete.

At block 214, the bridge controller 106 receives the first responsive data from the media controller 102. The bridge controller 106 then transmits the first responsive data to the host. The bridge controller 106 may transform the data from a first format (e.g., SATA, NVMe, etc.) to a second format supported by the host (e.g., USB, eSATA, etc.). As discussed above, the media controller 102 may be part of a drive 116 that does not support the second format supported by the host device. The bridge controller 106 can provide support for that second format by translating communications from the drive 116 received in the second from to the first format and vice versa.

At block 216, the bridge controller 106 receives no further operations from the host for a time period. In order to save power, the bridge controller 106 may be designed to enter an idle mode if no activity is found on the data interface for a specified time period (e.g., several seconds, a few minutes, etc.). Many processors and microcontrollers use an idle mode to save power. Common methods for implementing the idle mode are reducing the clock speed along with the processor voltage and sending parts of the processor into a sleep state. Some processors may have a halt instruction that stops the CPU until an interrupt occurs.

In one implementation, a timer (e.g., countdown or count-up) for idle time is maintained by the bridge controller. When a threshold time is reached by the timer during which there is an absence of data received through the data interface, the bridge controller enters the idle mode. If new data is received, the timer is reset.

At block 218, the bridge controller 106 enters the idle mode to save power. During the idle mode, the bridge controller 106 uses less power than during a normal operation mode. For example, the bridge controller 106 may use less than 1 Watt (W) during the idle mode.

Going back to block 206, after sending the first responsive data, the media controller 102 proceeds to block 208. At block, 208, the media controller 102 may perform background operations after completing the requested read and/or write operations. In some situations, the background operations may include maintenance operations such as garbage collection and self-tests to check for errors, reliability issues, or performance issues. For example, the self-test may include bandwidth or throughput tests to find the performance level of the storage device 100, counts of memory cells or sectors with errors to find the error level of the storage device, or error tests to find the reliability level of the storage device. One example of a self-test is the Self-Monitoring, Analysis, and Reporting Technology (S.M.A.R.T.), which is a built-in monitoring system found on many HDDs and SSDs.

Background operations can also include performing a cache flush, where data is moved from the faster cache (e.g., buffer 114) to slower persistent memory (e.g. storage media 104). Another background operation may be a folding operation. In a folding operation, data is moved from a faster nonvolatile memory to a slower nonvolatile memory. For example, the storage media 104 may include single-level cell (SLC) memory multi-level cell (MLC) memory, which is faster but more expensive persistent memory, as well as slower persistent memory, such as triple-level cell (TLC) memory or quad-level cell (QLC) memory which are cheaper. In order to keep manufacturing costs down, an SSD device typically uses a smaller amount of higher speed, expensive memory with a larger amount of cheaper, lower speed memory. By freeing up the faster memory using a cache flush and/or a folding operation, writes can be performed faster by writing to the faster memory rather than using the slower memory.

At block 210, after completing the background operations, the media controller 102 can enter the idle mode. As no additional read or write operation requests have been received, the media controller does not have additional work to perform. During idle mode, the media controller 102 can enter a lower power mode.

At block 212, the media controller 102 sends an idle message to the bridge controller 106. By sending a message to the bridge controller 106, the bridge controller 106 can find out that the media controller 102 has completed background operations and does not have further operations to perform. The bridge controller 106 can then shut down power to the media controller 102. If the bridge controller 106 attempts to shut down power without knowing the status of the media controller 102, the media controller 102 may be in the middle of performing background operations. Shutting down the media controller 102 during such operations can lead to data corruption issues or other types of problems.

The media controller 102 may enter the idle mode after sending the idle message or sending the idle message may be part of the process of entering the idle mode. Thus, while FIG. 2 shows the idle message as being sent after block 210, block 210 and 212 may, in some embodiments, be occurring in reverse order or concurrently.

At block 220, the bridge controller 106 receives data (e.g., an idle message) indicating the status of the media controller 102. The bridge controller 106 can then save state data from the media controller 102. The saved state data may be included as part of the idle message or may be requested separately from the media controller 102 by the bridge controller 106. The saved state data can include security status of the storage media (e.g., locked or unlocked to user access), auto-unlock data (e.g., cached user password, password hash, or other password derivative) for unlocking the storage media during resume from idle operations, as well as other types of data that facilitate restarting the media controller 102 into the same state as prior to the shutdown. For example, by unlocking the storage media using the saved state data, the storage media is accessible to the host device.

At block 222, the bridge controller 106 sends a shutdown command for the media controller 102. In one embodiment, the bridge controller engages a power switch/regulator disable feature of the media controller 102. By doing so, the bridge controller 106 can shut down the media controller 102. In contrast to the idle mode of the media controller 102, the media controller 102, in one embodiment, uses no power when shut down. Meanwhile, idle mode typically uses at least some power, though a low amount. The bridge controller 106 can then proceed to block 226. In some embodiments, the shutdown command may include a further command to the media controller 102 to perform one or more background operations. For example, the further command may be a cache flush command or a fold operation command.

At block 224, the media controller 102 receives the shutdown command from the bridge controller 106. The media controller 102 then shuts down to reduce the power usage. In one embodiment, the media controller 102 uses no power while shut down.

At block 226, the bridge controller 106 enters idle mode. With the bridge controller 106 in idle mode and the media controller 102 shut down, the external storage device 100 enters into a very low power mode, where power usage is even lower than a regular idle mode. During regular idle mode both the bridge controller 106 and the media controller 102 are idle, but still using some power. The process 200 may then end.

FIG. 3 is a flow diagram of a startup process 300 for exiting a very low power mode, according to some embodiments. As discussed above, in one embodiment, the bridge controller 106 is configured to power-up the media controller 102 when the media controller 102 has been shut down. For ease of explanation, the following describes the bridge controller 106 and media controller 102 as performing the process, though other components of the external storage device 100 may also be involved in performing one or more of the steps. In addition, the process is described using the components of the external storage device 100 of FIG. 1, however, other storage device embodiments can utilize the process 300.

At block 302, the external storage device 100 is in a very low power mode, with the bridge controller 106 in idle and the media controller 102 shut down or turned off. The bridge controller 106 then receives read and/or write operations from a host device (e.g., laptop 133 or desktop computer 131) on a data interface (e.g., the data portion of the data/power interface 108). In one embodiment, the data interface is a USB interface comprising a USB port of the external storage device 100.

At block 304, the bridge controller 106 sends a power-up (a.k.a. startup) command for the media controller 102 and also sends saved state data. As discussed above in FIG. 2, the bridge controller 106 is configured to save state data for the media controller before shutting the media controller down.

At block 306, the media controller 102 receives the power-up command. Startup power is then sent to the media controller 102. The media controller 102 then restarts itself using the saved state data sent by the bridge controller 106. With the saved state data, the media controller 102 can restart and end up in the same state prior to the shutdown. The media controller 102 may go through one or more processes (e.g., an enumeration process) to end up in the same state prior to the shutdown. As the media controller 102 is restored to the same state, communications from the host are treated as it would have been if the media controller 102 were not shut down. For example, user passwords or other security information do not need be given again as the media controller 102 restarts with the same security status (e.g., unlocked state, unencrypted state, etc.) as prior to the shutdown. In some embodiments, the media controller 102 sends a status message to the bridge controller 106, indicating that it is now active and can process read and/or write operations.

From block 304, the bridge controller 106 proceeds to block 308. At block 308, the bridge controller 106 then sends data to the media controller 102, the data including the read and/or write operations from the host device. The bridge controller 106 may transform the data received from the host device, by, for example, converting the data from being encapsulated in USB protocol to another protocol (e.g., SATA, NVMe, etc.) that is supported by the media controller.

At block 310, the media controller 102 receives the data from the bridge controller 106 and performs the read and/or write operations on the storage media 104 of the external storage device 100. For example, the media controller 102 may read data, write data, or perform maintenance operations on the storage media 104.

At block 312, the media controller 102 provides second responsive data to the bridge controller 106. For example, if the media controller 102 received a read request, it can send back the requested data. In another example, if the media controller 102 received a write request, it can send back a status update the write is completed.

At block 314, the bridge controller 106 receives the second responsive data from the media controller 102. The bridge controller 106 then transmits the second responsive data to the host. The bridge controller 106 may transform the data from a first format (e.g., SATA, NVMe, etc.) to a second format supported by the host (e.g., USB, eSATA, etc.).

Power Modes of the Storage Device

FIG. 4 is a table listing the power levels used by the external storage device 100 based on the status of the bridge controller 106 and media controller 102, according to certain embodiments. When the bridge controller and media controller are active, the external storage device 100 is in a normal power mode. When the bridge controller is active and the media controller is idle, the external storage device 100 is in a normal power mode. When the bridge controller is idle and the media controller is active, the external storage device 100 is in a normal power mode. When the bridge controller is idle and the media controller is idle, the external storage device 100 is in a low power mode. When the bridge controller is idle and the media controller is shut down or turned off, the external storage device 100 is in a very low power mode.

While the table describes one possible implementation of power usage levels, other implementations are possible. In addition, the power levels may be ranges rather than a specific power level usage. For example, a normal power level may include power usage that varies across several watts. In some embodiments, there may be additional power levels to more finely distinguish the variation between normal power levels (e.g., normal 1, normal 2, etc.).

Status Changes of the Media and Bridge Controllers

Figure 5:
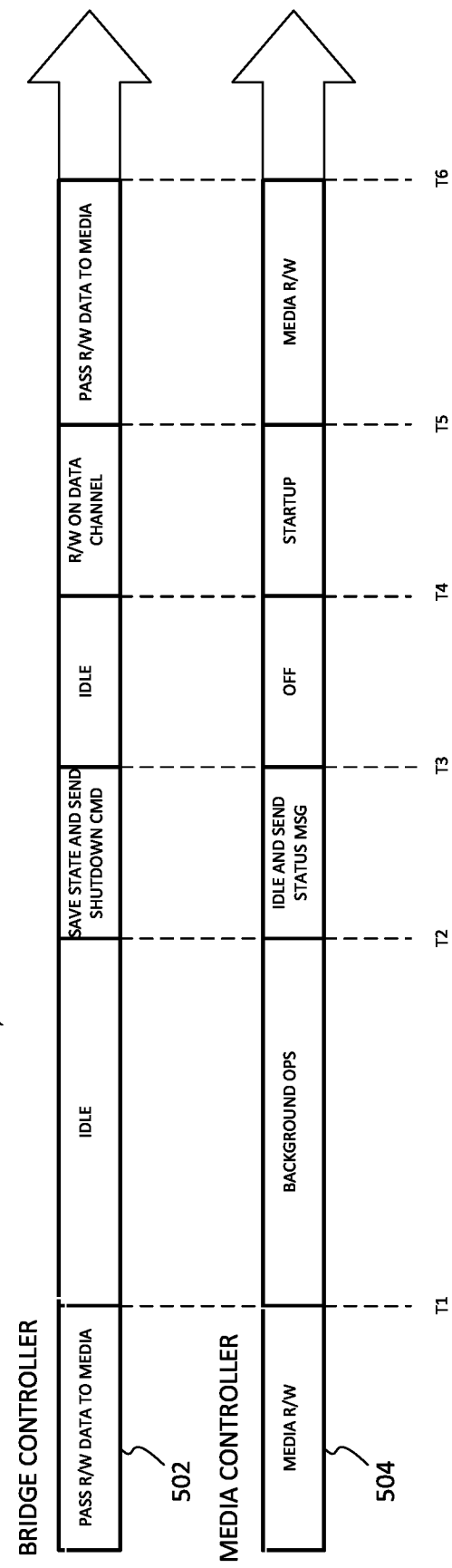
FIG. 5 is a timeline of the various states of a bridge controller and a media controller during the shutdown process and startup process described in FIGS. 2-3, according to some embodiments.

FIG. 5 is a timeline of the various states of the bridge controller 106 and media controller 102 during the shutdown process 200 and startup process 300 described in FIGS. 2-3, according to certain embodiments. The first bar 502 shows the various states of the bridge controller 106. The second bar 504 shows the various states of the media controller 102. Ticks (e.g., T1, T2, etc.) in the timeline indicate that events occur in bars 502, 504 at around the same time. However, the events do not necessarily occur at the exact same time, but may happen within a small amount of time (e.g., milliseconds to a few seconds) from each other.

The timeline begins with the bridge controller 106 and the media controller 102 both in active states, with the bridge controller 106 receiving data from the host device and the media controller 102 reading or writing data to the storage media. At T1, no further data is being received from the host device and the bridge controller 106 enters an idle mode. Meanwhile, the media controller 102 is free to complete any necessary background operations while no data is being received from the host.

At T2, after the background operations are completed, the media controller 102 can send a status message to the bridge controller 106 that it is idle and can then enter an idle mode. In response to the status message, the bridge controller 106 can obtain and save state data from the media controller 102 and send a shutdown command to the media controller 102.

At T3, In response to the shutdown command, the media controller 102 can change to a turned off or shutdown state. Meanwhile, the bridge controller 106 can return to an idle state.

At T4, the bridge controller 106 returns to an active state in response to read and/or write requests on the data channel from the host device. The bridge controller 106 can then send a startup command (optionally, with saved state data) to the media controller 102. The media controller 102 can then start-up using the saved state data.

At T5, the bridge controller 106 and the media controller 102 both in active states, with the bridge controller 106 receiving data from the host device and the media controller 102 reading or writing data to the storage media. When the data being sent by the host device stops, the bridge controller 106 and the media controller 102 can go back to idle and shutdown status, respectively, as described earlier.

ADDITIONAL EMBODIMENTS

Those skilled in the art will appreciate that in some embodiments, other types of concurrent file modification systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field programmable gate arrays (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. An external storage device configured to connect to a host device, the external storage device comprising:
    storage media configured to store one or more data files;
    a data interface configured to connect to the host device;
    a media controller configured to execute firmware of the external storage device, the media controller further configured to manage read and write operations on the storage media; and
    a bridge controller configured to manage the data interface, the bridge controller further configured to:
        in response to receiving an idle status message from the media controller during a time period in which the media controller is in an unlocked status and no further communications are received from the host device:
            save state data including the unlocked status of the media controller; and send a shutdown command to the media controller to stop the media controller from using power; and in response to receiving a read operation or a write operation from the host device:
startup power to the media controller;
provide the media controller with the saved state data to enable the media controller be restored to the unlocked status;
receive first data responsive to the read operation or the write operation from the media controller; and
transmit the first data to the host device;

wherein, in the unlocked status, a user password does not need to be re-provided to access the storage media.

2. The external storage device of claim 1, wherein sending the shutdown command comprises sending a cache flush command.

3. The external storage device of claim 1, wherein the media controller is further configured to:
after completing background operations and in the absence of read or write operations from the host device, send the idle status message to the bridge controller.

4. The external storage device of claim 3, wherein the background operations comprise at least one of:
a cache flush from a buffer of the external storage device to the storage media; or
a self-test to determine a performance level or reliability level of the external storage device.

5. The external storage device of claim 1, wherein the bridge controller is further configured to save auto-unlock data that includes a user password or a derivative of the user password.

6. The external storage device of claim 1, further comprising a solid-state drive (SSD), the SSD comprising the storage media and the media controller.

7. The external storage device of claim 6, wherein the SSD comprises a standard 3.5 inch or M.2 form factor.

8. The external storage device of claim 1, further comprising a hard disk drive (HDD), the HDD comprising the storage media and the media controller.

9. The external storage device of claim 8, wherein the HDD comprises a standard 3.5 inch or 5.25 form factor.

10. The external storage device of claim 1, wherein the external storage device is an unpowered portable drive with a universal serial bus (USB) port.

11. The external storage device of claim 10, wherein:
the data interface comprises the USB port; and
the bridge controller is further configured to translate from a protocol supported by the media controller to a USB protocol supported by the host device.

12. A method for reducing idle power usage of a storage device, the storage device comprising a media controller, a data interface configured to connect to a host device, storage media, and a bridge controller, the method comprising:
in response to receiving, at the bridge controller, an idle status message from the media controller during a time period in which the media controller is in an unlocked status and no further communications are received from the host device:
saving state data including the unlocked status of the media controller;
sending a shutdown command to the media controller; and
shutting down power to the media controller; and
in response to receiving, at the bridge controller, a read operation or a write operation from the host device:
starting power to the media controller;
providing the media controller with the saved state data to enable the media controller to be restored to the unlocked status;
receiving first data responsive to the read operation or the write operation from the media controller; and
transmitting the first data to the host device;
wherein, in the unlocked status, a user password does not need to be re-provided to access the storage media.

13. The method of claim 12, wherein sending the shutdown command comprises sending a cache flush command.

14. The method of claim 13, wherein the cache flush command causes the media controller to:
transfer data from a buffer of the storage device to storage media of the storage device.

15. The method of claim 12, wherein the media controller is configured to:
after completing background operations and in the absence of read or write operations from the host device, send the idle status message to the bridge controller.

16. The method of claim 15, wherein the background operations comprise at least one of:
a cache flush from a buffer of the storage device to storage media of the storage device;
a folding operation from higher speed memory of the storage device to lower speed memory of the storage device; or
a self-test to determine a performance level or reliability level of the storage device.

17. The method of claim 12, wherein the storage device is an unpowered portable drive with a universal serial bus (USB) port.

18. The method of claim 12, further comprising saving auto-unlock data that includes a user password or a derivative of the user password.

19. The method of claim 12, wherein in the unlocked status the first data stored in the storage media is accessible by the host device.

20. An external storage device configured to connect to a host device, the external storage device comprising:
means for storing one or more data files;
means for connecting to the host device;
a media controller configured to execute firmware of the external storage device, the media controller further configured to manage read and write operations of the means for storing; and
a bridge controller configured to manage the means for connecting, the bridge controller further configured to:
in response to receiving an idle status message from the media controller during a time period in which the media controller is in an unlocked status and no further communications are received from the host device:
save state data including the unlocked status of the media controller; and
send a shutdown command to the media controller to stop the media controller from using power; and
in response to receiving a read operation or a write operation from the host device:
startup power to the media controller;
provide the media controller with the saved state data to enable the media controller to be restored to the unlocked status;
receive first data responsive to the read operation or the write operation from the media controller; and
transmit the first data to the host device;

wherein, in the unlocked status, a user password does not need to be re-provided to access the means for storing.

\* \* \* \* \*